Figure 1:
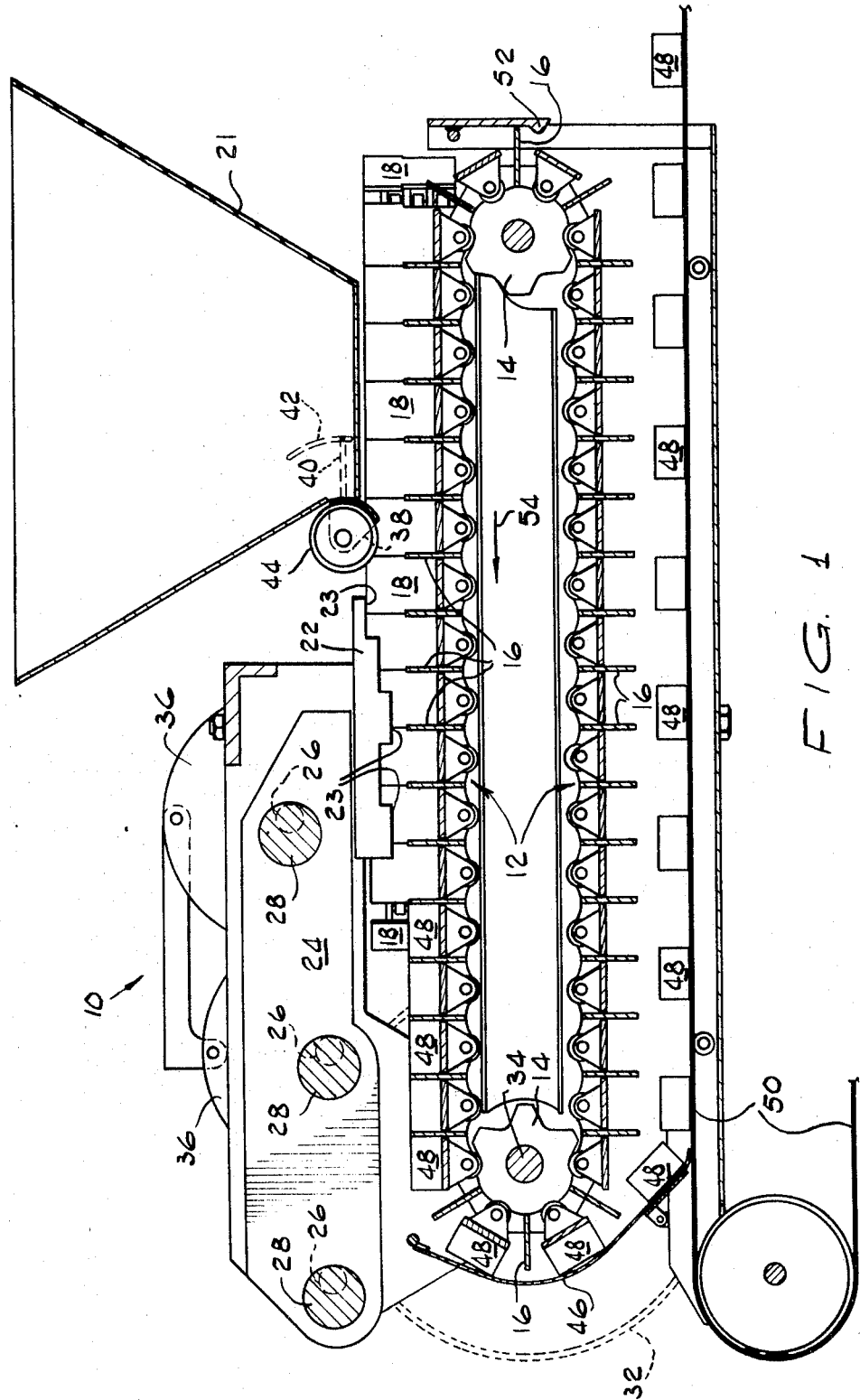

United States Patent [19]

Gouws

[11] 3,724,988
[45] Apr. 3, 1973

[54] PRESSURE MOULDING MACHINE

[76] Inventor: Wentzel Christoffel Gouws, 342 Main Reef Road, Wentworth Park, Krugersdorp, Republic of South Africa

[22] Filed: Oct. 4, 1971

[21] Appl. No.: 185,944

[30] Foreign Application Priority Data

Oct. 7, 1970 South Africa ........................70/6842

[52] U.S. Cl. ....................425/348, 425/350, 425/359
[51] Int. Cl. ..............................................B30b 11/14
[58] Field of Search......425/256, 259, 261, 346, 348, 425/350, 351, 357, 359, 360

[56] References Cited

UNITED STATES PATENTS

| | | | |
|---|---|---|---|
| 1,509,174 | 9/1924 | Pokorny | 425/357 |
| 1,691,899 | 11/1928 | Paley | 425/350 X |
| 1,803,408 | 5/1931 | Rouse | 425/357 |
| 1,831,176 | 11/1931 | Holm-Hansen | 425/350 X |
| 2,195,683 | 4/1940 | Ross et al. | 425/359 |

*Primary Examiner*—J. Howard Flint, Jr.
*Attorney*—Karl W. Flocks

[57] ABSTRACT

A pressure moulding machine which includes a plurality of open ended moulds each defined by a plurality of side and end walls relatively displaceable with respect to each other between one position being an article moulding position and another position being a moulded article discharge position. Each side wall of the mould is mounted on a driven carrier adapted to effect displacement of the side wall. Material charging means are provided for charging mouldable material into the open end of each mould. The machine also includes a cyclically operable ram member arranged to obturate the open end of each mould in succession thereby to compress the material charged into the moulds.

9 Claims, 2 Drawing Figures

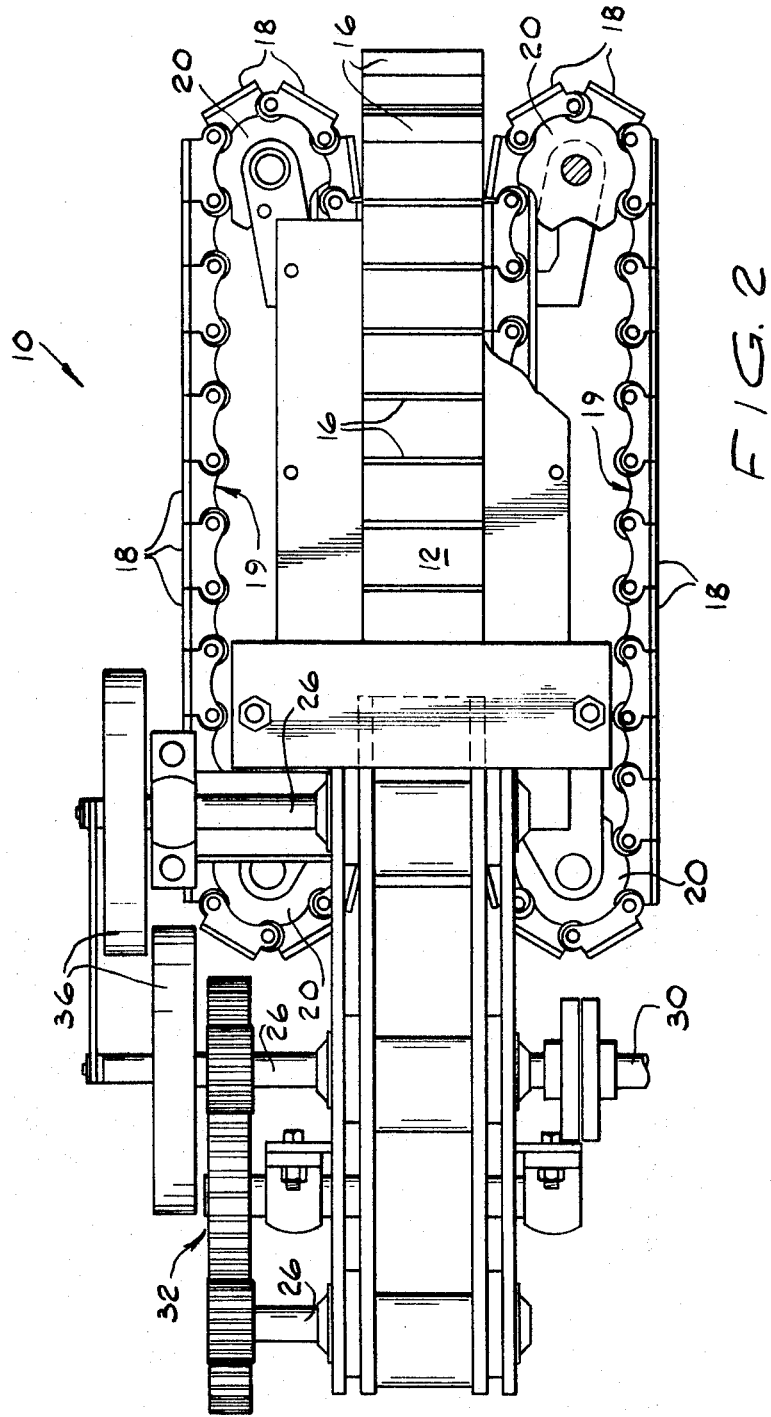

PRESSURE MOULDING MACHINE

This invention relates to a pressure moulding machine providing substantial continuous operation. More particularly the invention relates to a substantially continuously operating pressure moulding machine for the formation of building units or the like from a moist or damp mixture of discrete material and a binding or like composition, agent or the like.

According to the invention there is provided a pressure moulding machine which includes a plurality of open ended moulds each defined by a plurality of side and end walls relatively displaceable with respect to each other between one position being an article moulding position and another position being a moulded article discharge position;

each side wall of the mould being mounted on a driven carrier adapted to effect displacement of the side wall;

material charging means for charging mouldable material into the open end of each mould;

and a cyclically operable ram member arranged to obturate the open end of each mould in succession thereby to compress the material charged into the moulds.

Conveniently, the arrangement is such that material is charged into the moulds at or near one end of the driven carrier and the moulded articles are discharged at or near the opposite end of the carrier by displacement of the mould forming walls, the ram being positioned intermediate the ends of the carrier.

The driven carrier and the ram may be driven for continuous and uninterrupted movement and at the same speed.

If desired, end wall carriers may be mounted one on each side of the driven carrier to operate in planes at right angles to the plane of operation of the driven carrier, the end wall carriers carrying a plurality of individual end walls. The moulds may thus be open in respect of ends disposed parallel to the direction of motion and may be closed off by the individual ends walls, driven at the same speed as the carrier, and arranged to form mould end wall prior to the moulds reaching the material charging position and maintained against outward displacement until termination of the pressure application. After termination of pressure application, the walls of each mould are displaced to permit successive removal of the moulded articles or units while the mould walls are brought to the operative material receiving position when approaching the charging position. The opening displacement and subsequent closing assembly of the walls of the successive moulds may be adapted to take place one after the other in succession.

The end wall carriers may conveniently be driven by inter-engagement between the side walls on the driven carrier and the end walls on the end wall carriers.

The ram member may be arranged to obturate a plurality of e.g. adjacent open ends of the moulds simultaneously. The ram member may be mounted on an eccentrically driven ram support and driven e.g. by a crankshaft arrangement.

The material charging means may be in the form of a hopper having an adjustable outlet opening for varying the rate at which material is charged into the moulds.

The machine may further include a material levelling member arranged intermediate the material charging means and the ram member, for effecting an initial levelling operation of the material charged into the moulds.

The machine may also include a conveyor arrangement adapted to convey moulded articles away from the machine after separation of the moulded articles from the moulds.

If desired, a surface formation may be provided arranged to guide the moulded articles onto the conveyor arrangement after separation of the moulded articles from the moulds. The conveyor arrangement may be in the form of a belt conveyor, used for removal or transferance of the moulded articles to further treatment means if required, for storage, or to transport vehicles, or the like.

A moulded article ejector arrangement may be provided for ejecting moulded articles from the moulds before fresh material is charged into the moulds. The ejector arrangement thus ejects moulded articles which may have become stuck in the moulds after the displacement of the mould walls.

The driven carrier may comprise an endless robust chain-like structure mounted on horizontally spaced sprocket assemblies and carrying the side walls of the moulds on its outwardly directed face. The chain-like structure may be movably supported on rigid and pressure resisting means during at least the pressure application region of travel of the upper run of the chain structure. The chain structure, which may be driven through suitable gear means or the like at a predetermined speed by a prime mover, may be provided with rollers adapted for engaging rails or a rigid surface which form the said pressure resisting means to prevent downward deflection during the operative run of the chain structure during pressure application.

The end wall carriers, arranged parallel to the direction of movement, may comprise similar endless chain-like structure mounted about vertically disposed and horizontally spaced sprockets. The inwardly directed runs have spaced end walls adapted to engage with the ends of the side plate on the driven carrier. At the pressure applying region of the apparatus the inside faces of the operative runs of the end wall carriers may be in engagement with rigid face forming members which prevent outward deflection.

The various moulding faces of the mould walls may be provided with moulding formations of various patterns, designs or configurations.

An embodiment of the invention is now described by way of example with reference to the accompanying drawings, in which:

FIG. 1 shows a sectional side elevation of a pressure moulding machine in accordance with the invention; and FIG. 2 shows a plan view of the machine shown in FIG. 1 with various parts removed for the sake of clarity.

Referring to the drawings, reference numeral 10 generally indicates a pressure moulding machine which includes an endless continuously driven carrier 12. The carrier 12 is mounted on sprockets 14 and has a plurality of mould side walls in the form of outwardly extending plates 16. Further walls 18 forming end walls of the moulds are provided on spaced parallel end wall carriers 19. The end wall carriers 19 are each mounted on a pair of vertically displaced horizontally spaced sprockets 20 on either side of the carrier 12.

The machine further includes material charging means in the form of hopper 21 so positioned to charge material into the moulds formed by the side and end walls 16 and 18 respectively. The machine also includes a cyclically operable ram member 22 (not shown in FIG. 2) mounted on ram support member 24 which is eccentrically driven by means of crankshafts 26 housed in bushes 28. The ram member 22 has a plurality of ram faces 23 arranged to obturate a plurality of the open ends of the moulds simultaneously.

The carriers 12 and 19 are in the form of robust chain-like structures. The carriers 19 are driven by the interengagement between the side walls 16 and the end walls 18 of the moulds. The carrier 12 is driven by an electric motor and gearbox (not shown) connected to power input shaft 30 which drives gear train 32 which in turn drives one of the sprockets 14 via shaft 34. Two flywheels 36 are provided also driven by shaft 30.

The rate of charging of material into the moulds is controlled by an adjustable vane gate 38 at the outlet end of the hopper 21. The gate 38 is adjusted by hand lever 40 slidably guided by a guide plate 42.

A material levelling member in the form of roller 44 is provided intermediate the hopper 21 and the ram member 22 for effecting an initial levelling operation of the material charged into the moulds.

A surface formation in the form of resilient belting 46 is provided at the discharge end of the carrier 12 for guiding the moulded articles 48 when the walls 16 and 18 of the moulds are displaced to release the moulded articles. From the surface formation 46, the moulded articles 48 move under gravity onto a belt conveyor 50 for removal away from the machine.

An ejector arrangement 52 prevents stuck moulded articles reaching the upper run of the driven carrier 12.

In use, material is charged from the hopper 21 into each mould formed by the walls 16 and 18. The material is initially levelled by roller 44 and moved by the carrier 12 in the directions of arrow 54 to beneath the ram member 22 where the material is compressed by the shock loads applied by the ram member 22. The moulded articles then progress to the discharge end after the end walls 18 have moved away from the carrier 12. This leaves the moulded articles 48 held merely by the side walls 16. Upon further progress along the carrier 12, the side walls 16 open as the carrier 12 travels around the sprocket 14. The moulded articles 48 are then guided by the surface formation 46 and move under gravity onto the belt conveyor 50 from where they are removed for further treatment, storage, or the like.

What I claim is:

1. A pressure moulding machine which includes a plurality of open ended moulds each defined by a plurality of side and end walls relatively displaceable with respect to each other between one position being an article moulding position and another position being a moulded article discharge position;

each side wall of the mould being mounted on a driven carrier adapted to effect displacement of the side wall;

material charging means for charging mouldable material into the open end of each mould;

and a cyclically operable ram member arranged to obturate the open end of each mould in succession thereby to compress the material charged into the moulds.

2. A pressure moulding machine as claimed in claim 1, in which end wall carriers are mounted one on each side of the driven carrier to operate in planes at right angles to the plane of operation of the driven carrier, the end wall carriers carrying a plurality of individual end walls.

3. A pressure moulding machine as claimed in claim 2, in which the end wall carriers are driven by interengagement between the side walls on the driven carrier and the end walls on the end wall carriers.

4. A pressure moulding machine as claimed in claim 1, in which the ram member is arranged to obturate a plurality of the open ends of the moulds simultaneously.

5. A pressure moulding machine as claimed in claim 1, in which the material charging means is in the form of a hopper having an adjustable outlet opening for varying the rate at which material is charged into the moulds.

6. A pressure moulding machine as claimed in claim 1, which further includes a material levelling member arranged intermediate the material charging means and the ram member, for effecting an initial levelling operation of the material charged into the moulds.

7. A pressure moulding machine as claimed in claim 1, which further includes a conveyor arrangement adapted to convey moulded articles away from the machine after separation of the moulded articles from the moulds.

8. A pressure moulding machine as claimed in claim 7, which further includes a surface formation arranged to guide the moulded articles onto the conveyor arrangement after separation of the moulded articles from the moulds.

9. A pressure moulding machine as claimed in claim 1, which further includes a moulded article ejector arrangement for ejecting moulded articles from the moulds before fresh material is charged into the moulds.

* * * * *